United States Patent [19]
Giannuzzi

[11] Patent Number: 5,447,005
[45] Date of Patent: Sep. 5, 1995

[54] REVERSE WEDGE TRUSS-FORMING WALL ANCHOR

[76] Inventor: Louis N. Giannuzzi, 59 Dingletown Rd., Greenwich, Conn. 06830

[21] Appl. No.: 155,298

[22] Filed: Nov. 22, 1993

[51] Int. Cl.⁶ ............................ F16B 13/06; E04B 1/38
[52] U.S. Cl. .................................... 52/698; 411/29; 411/30; 411/44
[58] Field of Search ................ 411/29, 30, 44; 52/698

[56] References Cited

U.S. PATENT DOCUMENTS

| | | | |
|---|---|---|---|
| 4,500,238 | 2/1985 | Vassiliou | 411/30 |
| 4,765,788 | 8/1988 | Nowak et al. | 411/61 |
| 4,828,439 | 5/1989 | Giannuzzi | 411/37 |
| 4,874,277 | 10/1989 | Nowak et al. | 411/61 |
| 5,100,273 | 3/1992 | Vassiliou | 411/30 X |
| 5,307,603 | 5/1994 | Chiodo | 52/698 |

*Primary Examiner*—Carl D. Friedman
*Assistant Examiner*—Wynn E. Wood
*Attorney, Agent, or Firm*—Michael Ebert

[57] ABSTRACT

A dagger-like anchor drivable into a hollow wall and adapted to receive a fastener screw to hold an object adjacent the wall. The anchor is fabricated from a sheet metal blank, shaped, folded and hardened to define a head having a hole to threadably receive the screw, and a pair of normally juxtaposed flat blades aligned with the hole and extending from the head, the blades terminating in triangular sections coming to a point to penetrate the wall. The blades are each provided at offset intermediate positions with a tab that projects through a complementary slot in the other blade. When the anchor is driven into the wall so that its head lies against the outer surface of the wall, and the fastener screw is then inserted in the hole and turned to advance between the blades, the screw acts to spread the blades and their tabs apart. This causes the tabs to engage the screw to create within the body of the wall a truss whose base chords are formed by the projecting tabs engaging the screw and whose side chords by the blades, the screw then forming the central strut of the truss. The truss acts as a reverse wedge to enhance the holding power of the anchor.

12 Claims, 2 Drawing Sheets

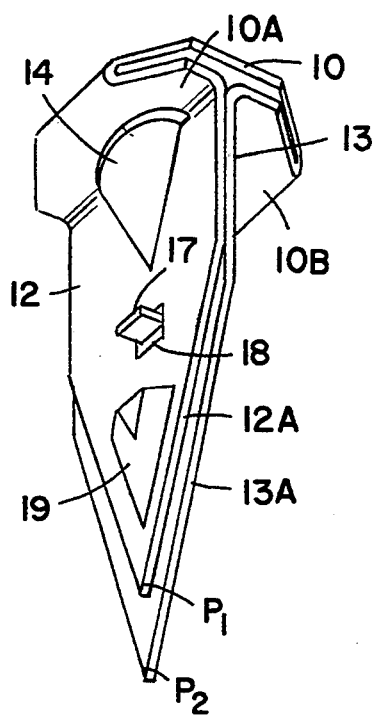
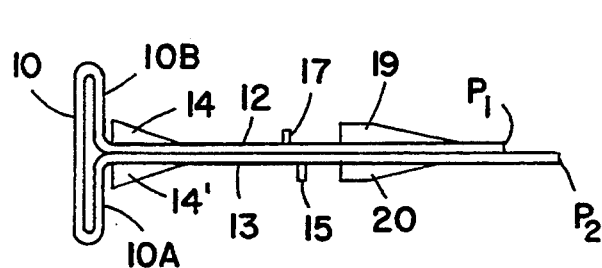
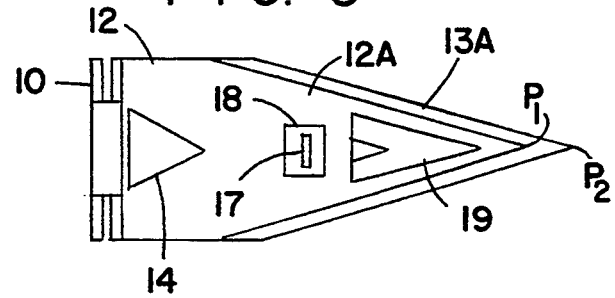
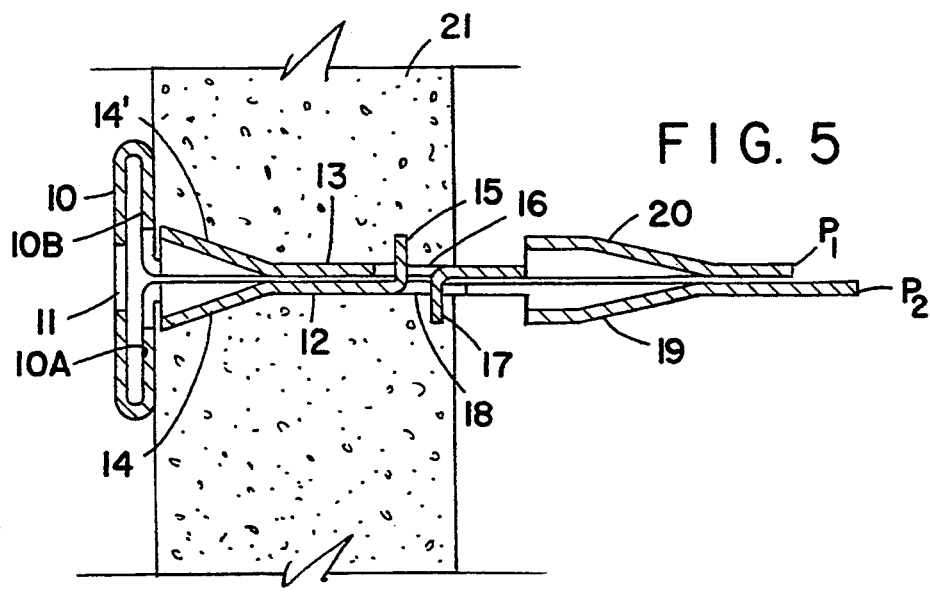

REVERSE WEDGE TRUSS-FORMING WALL ANCHOR

BACKGROUND OF INVENTION

1. Field of Invention

This invention relates generally to an anchor which when installed in a hollow wall is adapted to receive a fastener screw to hold an object adjacent the wall, and more particularly to a dagger-like sheet metal that is drivable into the wall, thereby dispensing with the need to pre-drill a hole therein, the anchor when installed and the fastener screw is received therein, creating a truss within the body of the wall which acts as a reverse truss to resist pull-out forces.

2. Status of Prior Art

In order to mount fixtures, brackets and other objects adjacent the outer surface of a wall formed of plasterboard, sheetrock, fiberboard or other material employed in hollow wall construction, the conventional practice is to use an anchor for this purpose made of synthetic plastic material or metal. When wedged into a hole pre-drilled in the wall, the anchor is adapted to receive a fastener screw. This screw goes through a mounting hole in the object to be fastened to the wall so that when the fastener screw is fully received in the anchor, the object is then held in place adjacent the wall.

The installation of a conventional anchor of this type entails three distinct operations. The first and most critical step is to drill a hole in the wall of the right diameter. Should an oversized hole be drilled, then in the next step in which the anchor is pushed into the drilled hole, the anchor will not wedge firmly therein. Hence it would not be possible to carry out the third step which is to turn the fastener screw into the anchor, for if the anchor is loose within the hole, turning the screw will also rotate the anchor and the screw will not advance.

A householder or do-it-yourselfer, in order to install a conventional anchor, requires not only a manual or an electrially operated drill for this purpose, but also a drill bit of the proper diameter. The need to drill a hole in a hollow wall having a diameter appropriate to the size of the particular anchor to be installed, has discouraged many non-professionals from installing such anchors.

Recognizing the desirability of an anchor that does not require a drilling operation to install, self-drilling anchors have been developed to satisfy this need. One such self-drilling anchor is disclosed in the Giannuzzi patent U.S. Pat. No. 5,234,299 in which the anchor which is turned into a wall by a screwdriver, has an externally-threaded shank section whose head is engageable by the screwdriver, the shank section having a longitudinal bore to receive a fastener screw. Extending axially from the shank section is a core drill section which when the anchor is turned in by the screwdriver, bores a round hole in the wall which is then tapped by the turning shank section.

The holding power of an anchor is determined by the force it takes to pull the installed anchor out of the wall. This force is produced by the object fastened to the wall, and if the object is heavy, the holding power of the anchor may be inadequate to prevent the object from pulling it out of the wall.

In a conventional anchor of the hollow plug type that goes into a hole drilled in the wall, when the fastener screw is advanced through the cavity in the body of the plug, it acts to expand this body and in doing so to compress the wall material surrounding the hole, thereby wedging the anchor firmly within the hole. But since this material is usually plaster, or formed of fibers, or bonded particles lacking in structural strength and easily pulverized, the holding power of a conventional anchor is not high. However, it is adequate for those installations in which the object that is fastened to the wall is relatively light in weight.

The holding power of a self-drilling anchor in which an externally-threaded shank section taps the hole drilled in the wall by the drill section of the anchor does not depend on a wedging action, but on the fact that the internal thread tapped in the material of the wall surrounding the hole mates with the external thread on the shank section of the anchor. But since the internal thread is cut in plaster or other frangible or friable hollow wall material, the holding power of a self-drilling anchor is not high.

A wall anchor that is easy to install, yet has reasonably good holding power is the sword-like anchor disclosed in the Vassiliou patent U.S. Pat. No. 4,500,238 and in the Nowak et al. patents U.S. Pat. Nos. 4,765,788; 4,874,277 and 4,941,240, all of which disclose anchors of the Vassiliou type. These anchors are installed simply by driving them into a wall with a hammer, as one would a nail.

The Vassiliou anchor is fabricated of sheet metal blank that is cut, shaped, folded and heat treated to define a head having a center hole thereon, a flat neck depending from the head provided with an opening in the plane of the neck in alignment with the hole, and a pair of juxtaposed blades extending from the neck. When this anchor is driven into a hollow wall, the head of the anchor then lies against the outer surface of the wall, the neck is embedded in the body of the wall, and the blades then extend beyond the inner surface of the wall. And when a fastener screw enters the hole in the head and passes through the neck opening, as the screw continues to advance beyond the neck, it acts to spread apart the blades behind the wall.

The flat neck embedded in the wall material offers little resistance to pull out. The holding power of the Vassiliou anchor therefore depends mainly on the resistance to pull out produced by the spread-apart blades. This resistance is limited, for the blades are formed of spring metal, and when the anchor is subjected to a heavy pull-out force, the spread out blades can inwardly deflect thereby reducing their resistance to pull out through the wall material.

Inasmuch as an anchor in accordance with the invention, creates a truss when it is installed in a wall and a fastener screw is received therein, of background interest is the Giannuzzi patent U.S. Pat. No. 4,828,439 which discloses a plastic anchor, that when inserted in a hole drilled in a hollow wall and a fastener screw is inserted therein, creates behind the wall a triangular truss in which the screw forms a central strut.

SUMMARY OF INVENTION

In view of the foregoing, the main object of the invention is to provide a dagger-like anchor that when driven by a hammer or other tool into a hollow wall or substrate is adapted to receive a fastener screw to hold an object adjacent the wall, the installed anchor in combination with the screw creating a truss within the body of the wall which acts as a reverse wedge enhancing the holding power of the anchor.

More particularly, an object of the invention is to provide an anchor of the above type fabricated of a sheet metal blank that is cut, shaped, folded and hardened to define the elements of the anchor.

A significant advantage of an anchor in accordance with the invention is that the reverse wedge created within the body of the wall acts to apply pressure to and compress the wall material engaged by the truss, thereby greatly increasing resistance to pull out.

Also an object of this invention is to provide a dagger-like anchor having a pair of juxtaposed blades terminating in triangular sections coming to a point to penetrate the wall, the sections each having formed thereon a triangular ramp which when the anchor is driven into the wall material, rides through the material to apply inward pressure to the blades to keep them together.

Yet another object of this invention is to provide a sheet metal dagger-like anchor that lends itself to low cost, mass production.

Briefly stated, these objects are attained by a dagger-like anchor that when driven into a hollow wall is adapted to receive a fastener screw to hold an object adjacent the wall. The anchor is fabricated from a sheet metal blank, shaped, folded and hardened to define a head having a hole to threadably receive the screw and a pair of normally juxtaposed flat blades aligned with the hole and extending from the head, the blades terminating in triangular sections coming to a point to penetrate the wall. The blades are each provided at offset intermediate positions with a tab that projects through a complementary slot in the other blade.

When the anchor is driven into the wall so that its head lies against the outer surface of the wall, and the fastener screw is then inserted in the hole and turned to advance between the blades, the screw acts to spread the blades and their tabs apart. This causes the tabs to engage the screw to create within the body of the wall a truss whose base chords are formed by the projecting tabs engaging the screw and whose side chords by the blades, the screw then forming the central strut of the truss. The truss acts as a reverse wedge to enhance the holding power of the anchor.

BRIEF DESCRIPTION OF DRAWINGS

For a better understanding of the invention, as well as further object and features thereof, reference is made to the detailed description thereof to be read in conjunction with the accompanying drawings wherein:

FIG. 1 is a perspective view of a preferred embodiment of a dagger-like sheet metal anchor in accordance with the invention;

FIG. 2 is a side view of the anchor as seen in a plane at right angles to the blades of the anchor;

FIG. 3 is a side view of the anchor as seen in a plane parallel to the blades;

FIG. 4 is a top view of the anchor;

FIG. 5 is a sectional view of the anchor installed in a hollow wall;

DETAILED DESCRIPTION OF INVENTION

Anchor Structure

Figure 6:
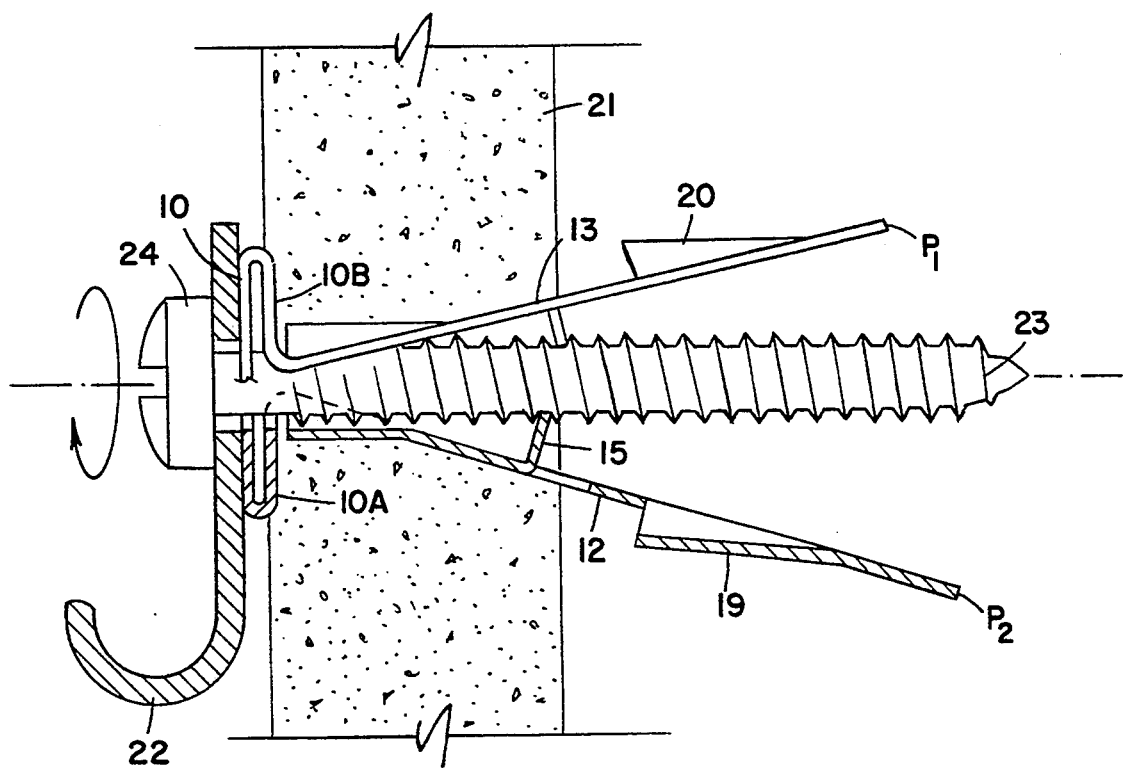
FIG. 6 shows the installed anchor after a fastener screw has been inserted therein to support a fixture adjacent the wall.

Referring now to FIGS. 1 to 4, a dagger-like anchor in accordance with a preferred embodiment of the invention is fabricated from a blank of thin sheet metal formed of steel or other metal having high strength and spring metal characteristics, so that when the blades of the anchor are deflected they seek to spring back to their original state. The sheet metal may be in a thickness being within a range of about 0.010 to 0.040 inches.

The blank is cut, shaped, folded and hardened by heat treatment in a manner similar to that carried out in connection with the sheet metal blank disclosed in the Vassiliou patent U.S. Pat. No. 4,500,238, to define a flat, hexagonally-shaped head 10 having a center hole 11 to threadably receive a fastener screw to hold an object adjacent the hollow wall or substrate into the anchor is driven by a hammer or other tool. Extending at right angles from the folded-in underside sections 10A and 10B of the head in alignment with center hole 11 and integral therewith is a pair of normally juxtaposed flat blades 12 and 13.

Blades 12 and 13 terminate in triangular sections 12A and 13A respectively, section 12A coming to a point $P_1$ and section 13A coming to a point $P_2$ for penetrating the hollow wall or substrate into which the anchor is driven.

Blade 13 is slightly larger than blade 12 so that point $P_2$ is ahead of point $P_1$. But in practice, the blades may be of substantially the same dimensions, in which case the points are not displaced from each other and both penetrate the wall at the same time.

Formed in blade 12 at its junction with the folded-in underside 10A of the head is a half section 14 of a bipartite conical guide cavity aligned with hole 11. Formed in blade 13 at its junction with the folded-in underside 10B of the head is the complementary half section 14' of the cavity. The conical guide cavity defined by the complementary half sections 14 and 14' is dimensioned to accommodate the conical point of a fastener screw inserted through center hole 11 in head 10, and threadably receive therein. As the screw is turned by a screwdriver and advanced, it is admitted between the spring metal blades 12 and 13 and proceeds to spread them apart so that the blades then angled in opposite directions with respect to head 10.

Struck out from blade 12 near the upper end of triangular section 12A at its midpoint is a tab 15 which projects through a complementary slot 16 cut in blade 13. A tab 17 struck out of blade 13 to socket the tab at a position offset with respect to tab 15 tab 17 projecting through a complementary slot 18 cut in blade 12. Hence the projecting tabs do not act to separate the juxtaposed blades.

Struck out from triangular section 12A of blade 12 is a triangular ramp 19 whose shape is similar to that of this section, but of smaller size so that the ramp which increases in height from its apex to its wide rear end lies within the triangular section. Struck out from triangular section 13A of blade 13 is a complementary ramp 20. When the dagger-like anchor is hammered into a wall, so that the pointed end of the anchor penetrates the wall and the juxtaposed blades pass through the wall material, the complementary ramps 10 and 20 on the blades then engage and are compressed by the wall material which apply inward pressure to the blades to hold them together to prevent their separation.

Installation of Anchor

The dimensions of the anchor are determined by the thickness of the hollow wall for which the anchor is intended. If therefore the hollow wall 21, shown in FIG. 5, has a thickness of ¾ of an inches, then the length of blades 12 and 13 is such that when the anchor is driven into the wall, tabs 15 and 17 are embedded within the wall material adjacent the inner surface 21 of the wall. The remaining portion of the blades including ramps 19 and 20, then extend beyond the inner surface of the wall.

As pointed out above, when the anchor is driven into the wall, ramps 19 and 20 are then subjected to inward pressure by the wall material to hold the blades together. But when the anchor is fully driven in so that its head 10 then lies against the outer surface of wall 21, ramps 19 and 20 are now behind the outer surface of the wall and the blades are free to separate behind the outer surface.

Installation of Screw Fastener

When, as shown in FIG. 6, a fixture 22 having a mounting hole is to be supported adjacent the outer surface of the hollow wall in which the anchor is installed, then a fastener screw 23 is inserted through the mounting hole of the fixture in to enter center hole 11 of head 10 of the anchor which then lies against the outer wall surface.

Screw 23 is provided with a slotted head 24 to receive the blade of a screwdriver. When screw 23 which is threadably received by the center hole in head 10 is turned, it advances between juxtaposed blades 12 and 13 and forces them apart. The spring metal blades, being hinged on the underside sections 10A and 10B of the head, are now angled within the wall material with respect to the head.

The projecting tabs 15 and 17 on blades 12 and 13 then engage screw 23, the tabs being thin enough to fall between adjacent external threads on the root of the screw. These tabs press into the screw by reason of the pressure applied to the blades by the wall material and by the spring action of the blades which seeks to return the blades to their juxtaposed position.

Figure 7:
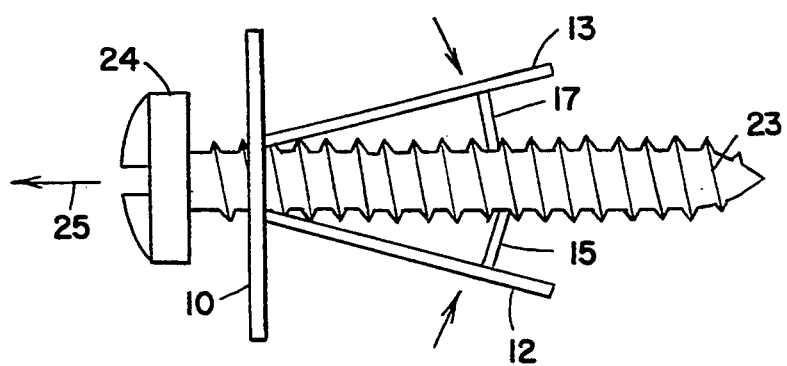
FIG. 7 schematically illustrates the truss created by the installed anchor in combination with the fastener screw.

As a consequence, the blades, in combination with screw 23, create a mechanical truss whose base chords, as shown in FIG. 7, are defined by projecting tabs 15 and 17 pressing into screw 23 and whose side chords are formed by angled blades 12 and 13, the apex of the truss being at head 10. The anchor screw 23 which extends from the apex of the truss to its base chord, forms the center strut of the truss.

Since the chords and center strut of the truss are embedded within the body of the wall, the truss acts as a reverse wedge and therefore offers high resistance to a pull-out force, represented by arrow 25 which seeks to pull the anchor out of the wall.

An anchor in accordance with the invention has, therefore, exceptional holding power, and can be used to support relatively heavy objects adjacent the wall. Thus if this object is suspended from the hook-shaped fixture 22, shown in FIG. 6, this object will not pull the anchor out of the wall for the pull-out force is distributed by the reverse wedge throughout the material of the wall and is not concentrated in the region penetrated by the dagger-like anchor.

While there has been shown a preferred embodiment of the invention, it is to be understood that many modifications may be made without departing from the essential spirit of the invention. Thus instead of tabs and complementary slots, each blade may be formed with a boss-like projection that fits into a complementary hollow socket formed in the other blade. And the anchor may also be molded or otherwise fabricated of resilient synthetic plastic material.

I claim:

1. An anchor driven into a hollow wall or other substrate formed of penetrable material and a fastener received in the anchor after it is installed in the wall to hold an object adjacent the wall, said anchor comprising:
   A. a head having a center hole therein to receive the fastener;
   B. a pair of blades in juxtaposed relation extending from the head in general alignment with the hole, said blades penetrating the wall when the anchor is driven therein to cause the head of the anchor to lie adjacent an outer surface of the wall; and
   C. a projection formed on each blade at intermediate positions thereon, whereby when the anchor is driven into the wall with its head lying adjacent said outer surface, a portion of the juxtaposed blades are embedded in the wall, and when the fastener is thereafter inserted in the center hole and advanced between the blades, the fastener then acts to spread the blades and their projections apart whereby the projections then engage the fastener to create a truss which acts as a reverse wedge to resist pull out of the anchor from the wall, said truss having base chords defined by the projections, side chords defined by the blades and a center strut defined by the fastener.

2. An anchor as set forth in claim 1, in which the blades are provided with triangular sections coming to a point to penetrate the body of the wall.

3. An anchor as set forth in claim 1, in which the blades are shaped to create at the junction of the blades and the head a conical guide cavity in alignment with the hole to receive the point of the fastener screw.

4. An anchor as set forth in claim 2, in which formed on the triangular section of each blade is a ramp which when the juxtaposed blades are driven into the wall, the blades are then subjected to inward pressure by the wall material pressing against the ramps to hold the blades together.

5. An anchor as set forth in claim 4, in which the ramps have a triangular shape and have a height that increases from the apex of the ramp to the rear end thereof.

6. An anchor as set forth in claim 1, in which each projection is formed by a tab and the complementary socket by a slot receiving the tab.

7. An anchor drivable into a wall formed of penetrable material and a fastener screw receivable in the anchor after it is installed in the wall to hold an object against the wall, the anchor being fabricated from a blank of sheet metal cut, shaped, folded and hardened to define an anchor comprising:
   A. a head having a center hole to threadably receive the screw; said head having inwardly-folded underside sections;
   B. a pair of normally juxtaposed blades integral with the underside sections in alignment with said hole, the blades terminating in triangular sections coming to a point to penetrate the wall material; and C. tabs at offset positions on the blades below the head, each blade tab projecting through a complementary slot in the other blade of the pair whereby when the screw is threadably received in the center hole and is advanced between the blades, it then acts to spread apart the blades and their tabs, whereby the blade tabs then engage the screw to create within the wall material a truss in which the tabs form base chords, the blades form side chords and the screw a central strut, said truss acting as a reverse wedge to resist pull out of the anchor.

8. An anchor as set forth in claim 7, further including a bipartite conical cavity in alignment with the hole to receive the point of the screw, said cavity being formed by conical half-section openings formed in each blade at the junction of each blade with the underside sections of the head.

9. An anchor as set forth in claim 8, in which the triangular section of each blade has a ramp formed thereon which is subjected to inward pressure by the wall material to hold the blades together when the anchor is driven into the wall.

10. An anchor as set forth in claim 7, fabricated of spring metal.

11. An anchor as set forth in claim 10, in which the metal is steel.

12. An anchor as set forth in claim 1, in which the fastener is provided with a screw thread and is threadably received in the hole.

* * * * *